(12) United States Patent
Chen et al.

(10) Patent No.: US 7,844,574 B2
(45) Date of Patent: Nov. 30, 2010

(54) SYSTEMS, METHODS AND COMPUTER PROGRAM PRODUCTS FOR AUTOMATIC NETWORK-BASED PERSISTENT XML STORAGE AND MANAGEMENT

(75) Inventors: Benson K. Chen, Durham, NC (US); Victor S. Moore, Lake City, FL (US); Cristi N. Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 12/103,842

(22) Filed: Apr. 16, 2008

(65) Prior Publication Data
US 2009/0265355 A1 Oct. 22, 2009

(51) Int. Cl.
*G06F 7/00* (2006.01)
*G06F 17/00* (2006.01)
*G06F 12/00* (2006.01)
*G06F 17/30* (2006.01)

(52) U.S. Cl. .................... 707/610; 707/695; 707/822

(58) Field of Classification Search ............. 707/610, 707/695, 822
See application file for complete search history.

(56) References Cited

U.S. PATENT DOCUMENTS

| 2007/0124294 | A1* | 5/2007 | Sun et al. ............... 707/3 |
| 2008/0046482 | A1* | 2/2008 | Oh et al. ............... 707/203 |
| 2008/0147751 | A1* | 6/2008 | Bao et al. ............... 707/202 |

* cited by examiner

*Primary Examiner*—Hosain T Alam
*Assistant Examiner*—Van H Oberly
(74) *Attorney, Agent, or Firm*—Cantor Colburn LLP; Jeanine Ray

(57) ABSTRACT

Systems, methods and computer program products for automatic network-based persistent XML storage and management. Exemplary embodiments include a method including loading an XDM widget having internal XML, sending an XCAP GET request via an XCAP URI parameter, retrieving an existing XML document at a location associated with the XCAP URI parameter, invoking an initializer callback function via the XDM widget to populate the internal XML with default values associated with an etag, wherein the etag is null, sending an XCAP PUT request via the XCAP URI to store the existing XML document, executing etag header scenarios, providing XML management functions to automatically publish changes to the server, and trigger a timer function to poll for updates from the server and display the resulting updates to the user's screen via a render callback function.

5 Claims, 5 Drawing Sheets

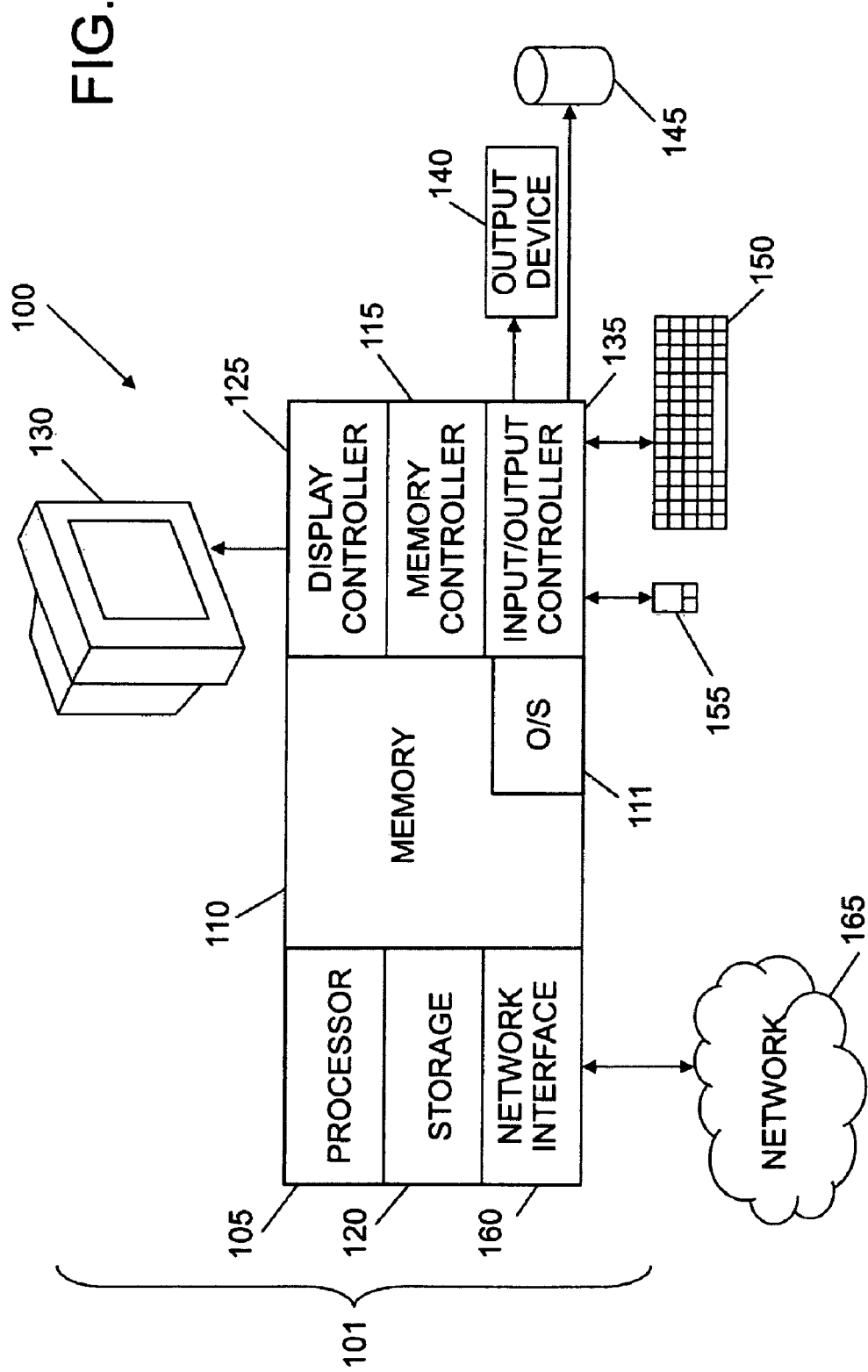

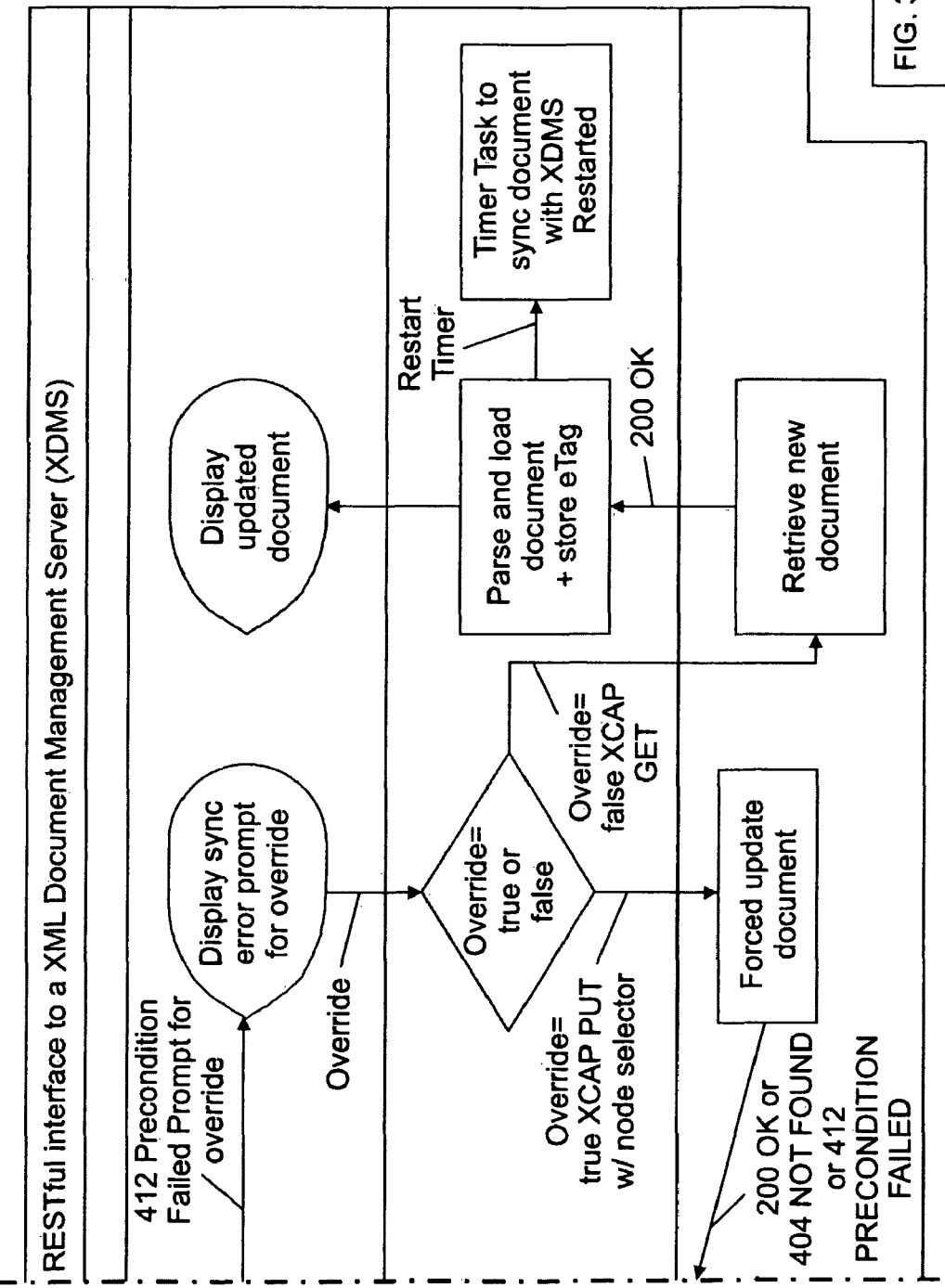

SYSTEMS, METHODS AND COMPUTER PROGRAM PRODUCTS FOR AUTOMATIC NETWORK-BASED PERSISTENT XML STORAGE AND MANAGEMENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to XML data management and storage, and particularly to systems, methods and computer program products for automatic network-based persistent XML storage and management for Web 2.0.

2. Description of Background

With the emergence of the Web 2.0 service creation model for next generation web applications there is a need to manage and store XML data on the network for central and persistent access.

SUMMARY OF THE INVENTION

Exemplary embodiments include a method including loading an XDM widget having internal XML, sending an XCAP GET request via an XCAP URI parameter, retrieving an existing XML document at a location associated with the XCAP URI parameter, invoking an initializer callback function via the XDM widget to populate the internal XML with default values associated with an etag, wherein the etag is null, sending an XCAP PUT request via the XCAP URI to store the existing XML document, executing etag header scenarios, including when the etag is null, sending an if-not-match=* header in the XCAP request to ensure that an existing document is not replaced if one exists, when the etag is not null, sending an if-match=<etag> in the XCAP request to ensure that an existing document that matches the client etag is replaced and replacing the local XML document with a document version on the server. XDM Widget functions can be provided to modify the local XML document for which the widget automatically pushes the updates to the server via XCAP methods to synchronize the XML document on the server. Conversely, a timer can be triggered to periodically poll the server via XCAP GET requests to check for new updates to the server's copy of the XML document. New updates of the XML document on the server can then be synchronized with the local XML document which triggers a callback function to render the new XML document to the user's screen.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, in which a JavaScript widget can be created that encapsulates the notion of an XML document that is persisted and managed by the XDMS. The widget can persist and manage the state of an XML document that represents the data model used by a JavaScript application. All of this can be done automatically without the JavaScript application invoking the XmlHttpRequest object.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates a block diagram of a system for automatic network-based persistent XML storage and management for Web 2.0;

Figure 2A:
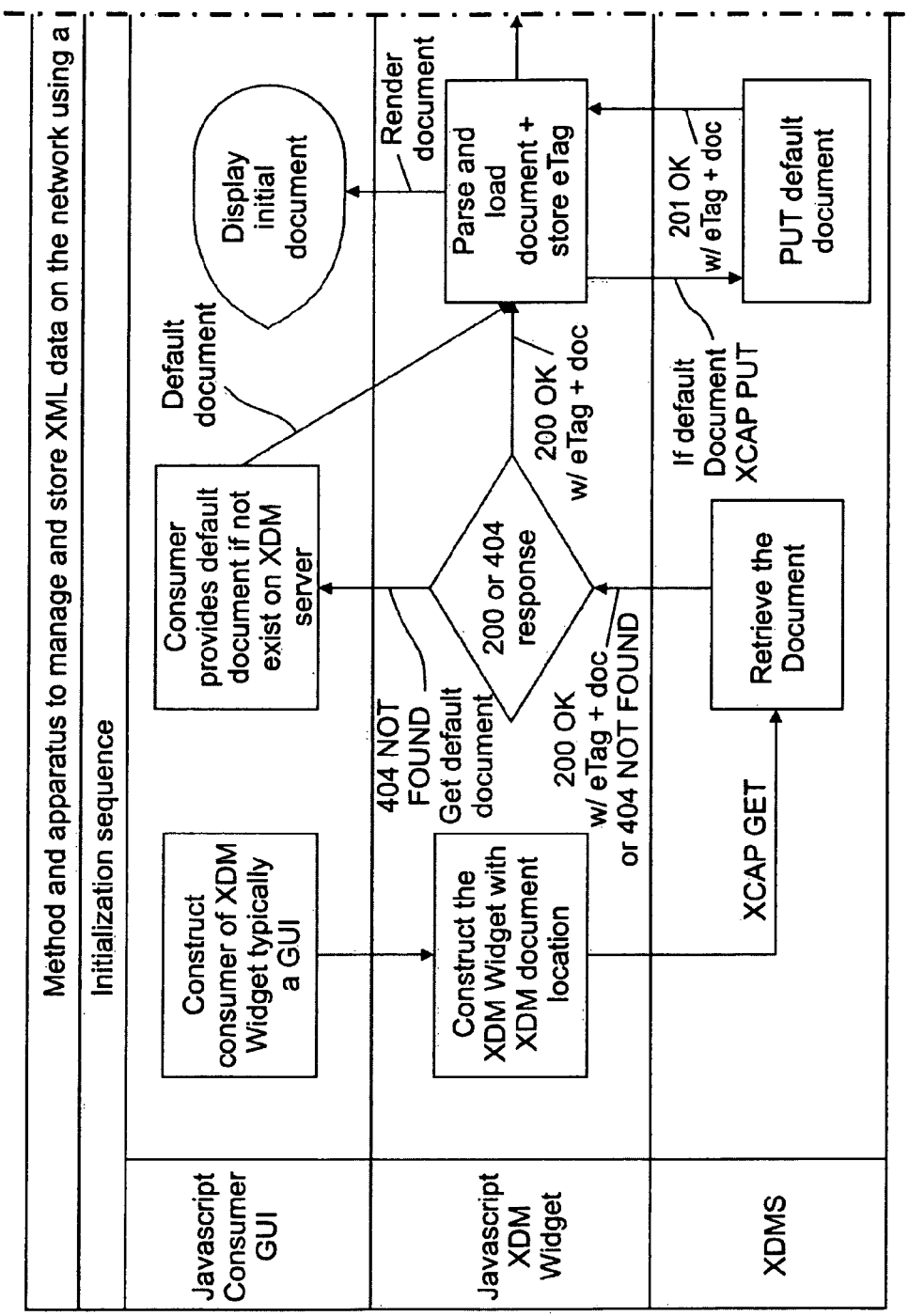
FIG. 2 illustrates an example of a flow chart for an initialization sequence method in accordance with exemplary embodiments.

The detailed description explains the preferred embodiments of the invention, together with advantages and features, by way of example with reference to the drawings.

DETAILED DESCRIPTION OF THE INVENTION

In exemplary embodiments, the systems and methods described herein include an XML Document Management Server (XDMS) that provides such XML storage and management services via an XCAP over HTTP interface. In exemplary embodiments, the systems and methods described herein include a RESTFUL interface that allows for creating (PUT), updating (PUT), fetching (GET), deleting (DELETE), and searching (POST) of XML documents within the XDMS. In exemplary embodiments, a JavaScript widget can be created that encapsulates the notion of an XML document that is persisted and managed by the XDMS. The widget can persist and manage the state of an XML document that represents the data model used by a JavaScript application. All of this can be done automatically without the JavaScript application invoking the XmlHttpRequest object.

FIG. 1 illustrates a block diagram of a system 100 for automatic network-based persistent XML storage and management for Web 2.0 in accordance with exemplary embodiments. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 101, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the XML storage and management methods described herein in accordance with exemplary embodiments and a suitable operating system (OS) 111. The operating system 111 essentially controls the execution of other computer programs, such as XML storage and management systems and methods described herein, and provides scheduling, input-output control, file and data management, memory management, and communication control and related services.

The XML storage and management methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the O/S 111. Furthermore, the XML storage and management methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems.

In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The XML storage and management methods described herein and the OS 111, in whole or in part, but typically the latter, are read by the processor 105, perhaps buffered within the processor 105, and then executed.

When the systems and methods described herein are implemented in software, as is shown in FIG. 1, the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The XML storage and management methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the XML storage and management methods are implemented in hardware, the XML storage and management methods described herein can implemented with any or a combination of the following technologies, which, are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2B:
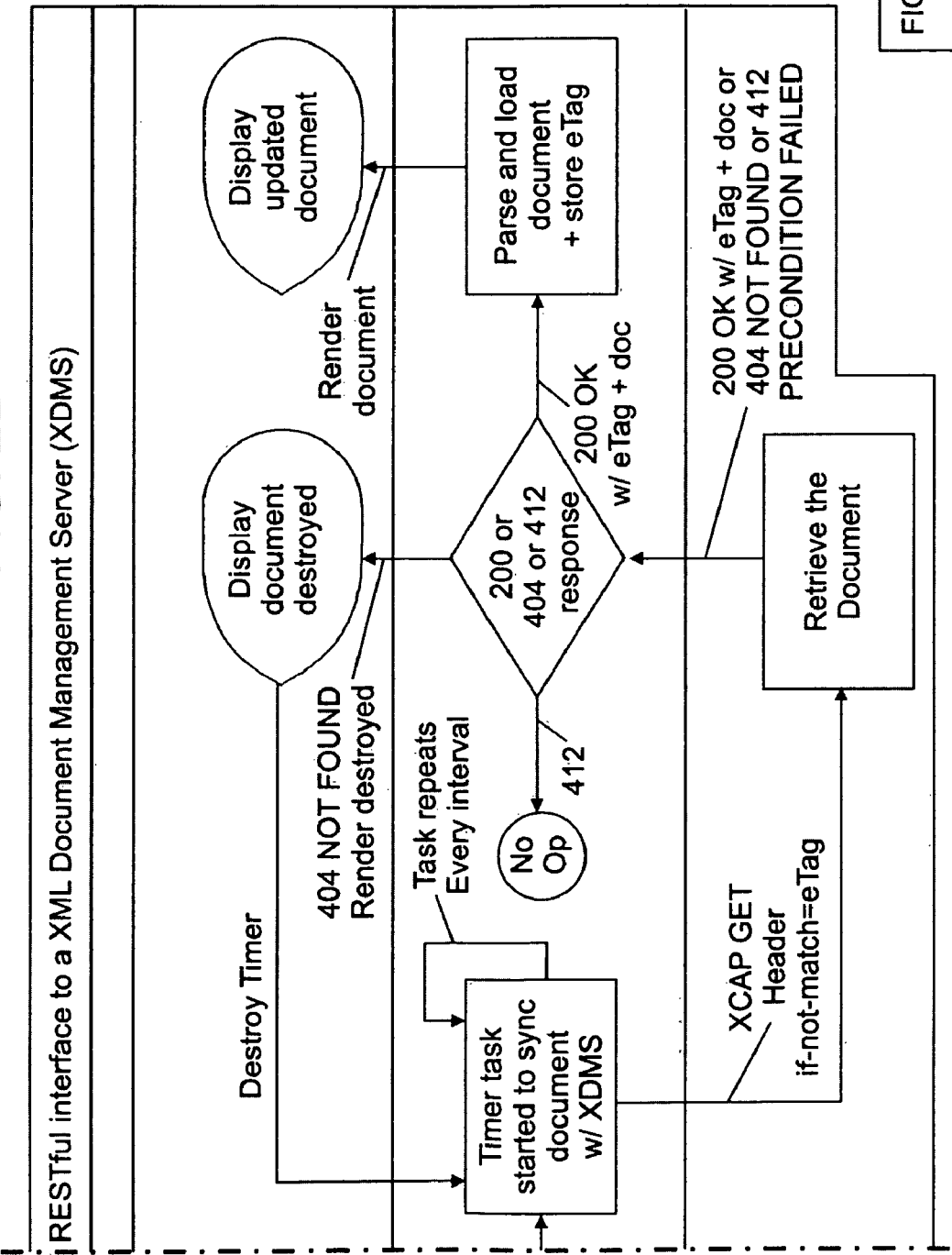
Figure 3A:
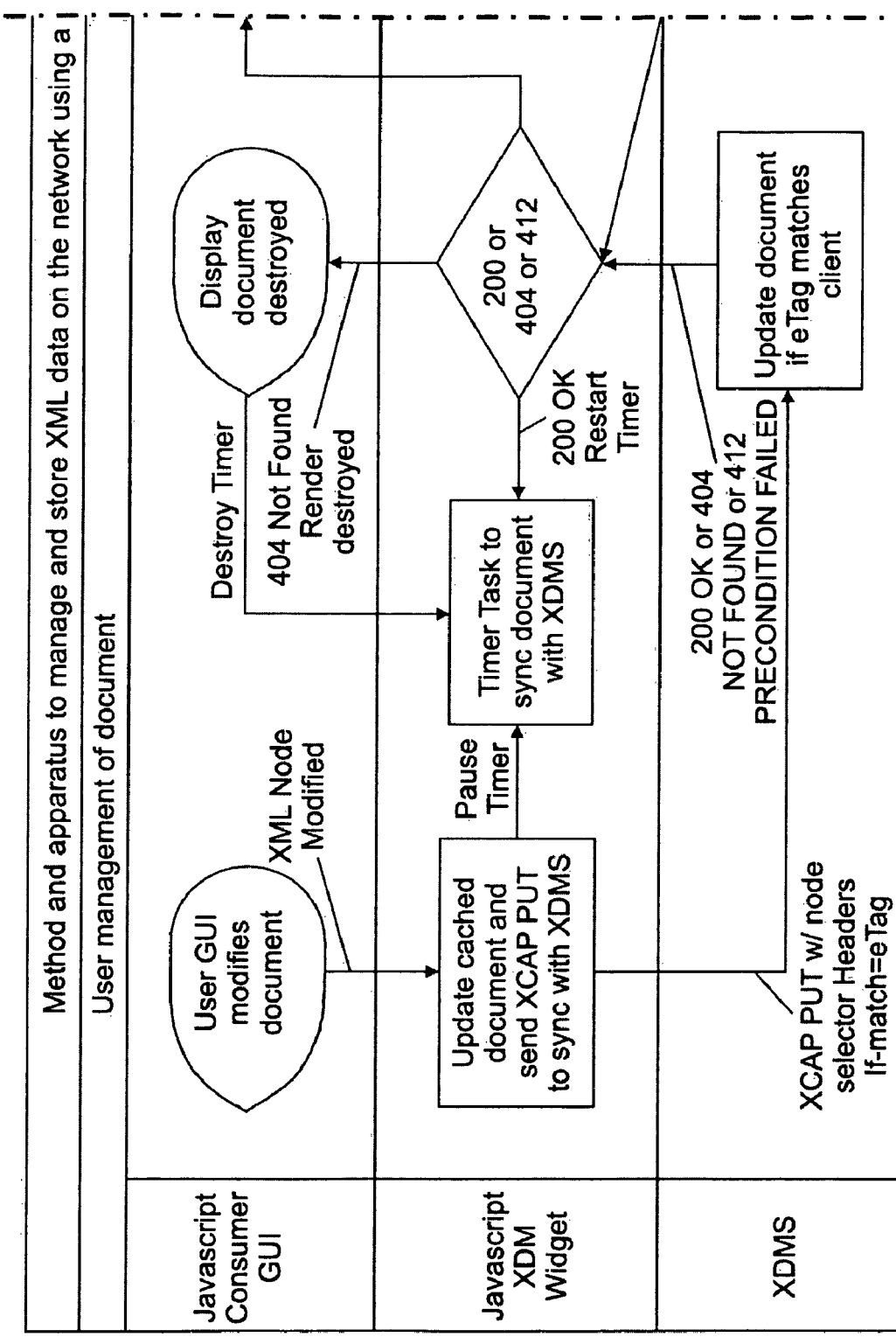
FIG. 3 illustrates an example of a flow chart for a user management method in accordance with exemplary embodiments.

FIG. 2 illustrates an example of a flow chart for an initialization sequence method 200 in accordance with exemplary embodiments. FIG. 3 illustrates an example of a flow chart for a document user management method 300 in accordance with exemplary embodiments. An exemplary method for automatic network-based persistent XML storage and management for Web 2.0 is now described. In exemplary embodiments, the JavaScript X-Display Manage (XDM) widget requires an XML Configuration Access Protocol (XCAP) URI (HTTP URL) that references the location of the document, the content-type of the managed XML, and two JavaScript functions: 1) Initializer callback to load default XML data, if the document does not previously exist on the XDMS; and 2) Processor callback to read the XML document after it has been retrieved from the XDMS. In exemplary embodiments, when the XDM widget is first loaded, it sends an XCAP GET request using the XCAP URI parameter to retrieve an existing XML document at that location. If the XDMS responds with a 404 Not Found response or there is no connectivity, the widget invokes the initializer callback function to populate the widgets internal XML with default values. The etag is null in this case. After the initialization, the widget sends an XCAP PUT request using the XCAP URI to store the initialized document. The following description discusses etag header scenarios that are always executed for XCAP PUT requests.

In exemplary embodiments, if the current etag is null, then the if-not-match=* header is sent in the XCAP request to ensure that an existing document is not replaced if one exists. If the current etag is not null, then the if-match=<etag> header is sent in the XCAP request to ensure that an existing document that matches the client etag will be replaced. For the above to cases, if the HTTP response indicates a conflict then that means the local XML document is stale and must be replaced by the version on the server. The following description discusses the steps that follow in exemplary embodiments.

Upon subsequent XCAP GET requests to the XDMS, the latest version of the XML document is returned to the widget and the processor callback function is invoked to read the new XML document data. Also, the appropriate headers such as last-modified date and etag are also made available as public variables within the widget. APIs are provided to modify the sub-elements and/or attributes. An XPATH can be used to represent the node path to the modified sub-element or attribute, which is sent as part of the XCAP PUT request to the XDMS to modify the stored document. A timer is set (configurable) to automatically send an XCAP GET request that includes if-not-match=<etag> HTTP header. This refreshes the document whenever etag value has changed (someone has modified the document on the XDMS). A destroy API is provided to clear the document from the XDMS. An XCAP DELETE request is sent to the XDMS to remove the stored document.

The XDM widget provides generic management of XML documents against an XDMS and is agnostic of the actual XML document information. Typically another application specific widget that has awareness of the XML document content encapsulates the XDM widget to provide the initializer and processor callback functions. The processor callback functions can inspect the XML and set global variables, which can be used for mashup purposes.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a computer system having an XML document management server, a method for automatic network-based persistent XML storage and management, the method comprising:
   a client loading an XDM widget having internal XML;
   the XDM widget sending an XCAP GET request via an XCAP URI parameter;
   the server receiving the XCAP GET request and retrieving an existing XML document at a location associated with the XCAP URI parameter;
   in response to the server responding with a 404 Not Found Response, the XDM widget invoking an initizalizer callback function via the XDM widget to populate the internal XML with default values associated with an etag, wherein the etag is null;
   the XDM widget sending an XCAP PUT request via the XCAP URI to store the existing XML document;
   in response to the XCAP PUT request, executing etag header scenarios, including:
      when the etag is null, sending an if-not-match=* header in the XCAP request to ensure that an existing document is not replaced if one exists;
      when the etag is not null, Sending an if-match= in the XCAP request thereby replacing an existing document that matches the client etag; and
      in response to receiving an HTTP conflict response indicating that a local XML document is stale, replacing the local XML document with a document version on the server.

2. The method as claimed in claim 1 further comprising:
   in response to receiving subsequent XCAP GET requests to the server, returning a latest version of an XML document to the XDM widget;

invoking a processor callback function to read the latest version of the XML document; and loading updated etag headers in the XDM widget.

3. The method as claimed in claim 2, further comprising providing APIs to modify the local XML document which causes the widget to invoke XCAP PUT requests to modify sub-elements and attributes of a stored XML document on the server to synchronize the local and server copy of the XML document.

4. The method as claimed in claim 3 further comprising:

setting a timer to automatically send the XCAP GET request that includes an if-not-match=<etag> HTTP header, wherein new updates to the XML document from the server are retrieved from the XCAP GET requests; and the XDM widget synchronizing the updates to the local XML thereby invoking the render callback function to display the resulting updated local XML document.

5. The method as claimed in claim 4 further comprising providing a destroy API to clear the existing XML document from the server.

* * * * *